(12) United States Patent
MacDonald et al.

(10) Patent No.: US 12,130,904 B2
(45) Date of Patent: Oct. 29, 2024

(54) FLEXIBLE CREDENTIAL SUPPORTED SOFTWARE SERVICE PROVISIONING

(71) Applicant: Snyk Limited, Berkshire (GB)

(72) Inventors: Jevon MacDonald, Halifax (CA); James Bowes, Dartmouth (CA)

(73) Assignee: Snyk Limited, Berkshire (GB)

( * ) Notice: Subject to any disclaimer, the term of this patent is extended or adjusted under 35 U.S.C. 154(b) by 469 days.

(21) Appl. No.: 17/294,682

(22) PCT Filed: Nov. 18, 2019

(86) PCT No.: PCT/US2019/062080
§ 371 (c)(1),
(2) Date: May 17, 2021

(87) PCT Pub. No.: WO2020/102822
PCT Pub. Date: May 22, 2020

(65) Prior Publication Data
US 2022/0019652 A1    Jan. 20, 2022

Related U.S. Application Data

(60) Provisional application No. 62/768,843, filed on Nov. 16, 2018.

(51) Int. Cl.
| | | |
|---|---|---|
| G06F 21/45 | (2013.01) | |
| G06Q 20/38 | (2012.01) | |
| G06Q 20/40 | (2012.01) | |
| H04L 9/06 | (2006.01) | |

(52) U.S. Cl.
CPC ......... *G06F 21/45* (2013.01); *G06Q 20/3829* (2013.01); *G06Q 20/401* (2013.01); *H04L 9/0643* (2013.01)

(58) Field of Classification Search
CPC ............................... G06F 21/45; H04L 9/0643
USPC ............................................................ 726/6
See application file for complete search history.

(56) References Cited

U.S. PATENT DOCUMENTS

| | | | |
|---|---|---|---|
| 2008/0114986 A1* | 5/2008 | Morris | G06F 21/46 726/19 |
| 2015/0180877 A1 | 6/2015 | Liu | |
| 2017/0324717 A1* | 11/2017 | Kravitz | H04L 63/08 |
| 2019/0007381 A1* | 1/2019 | Isaacson | G06Q 20/12 |
| 2019/0230070 A1* | 7/2019 | Isaacson | H04W 12/084 |

FOREIGN PATENT DOCUMENTS

WO        2020102822 A1     5/2020

OTHER PUBLICATIONS

International Search Report and Written Opinion received for PCT Patent Application No. PCT/US2019/062080, mailed on Mar. 3, 2020, 7 pages.

\* cited by examiner

*Primary Examiner* — Teshome Hailu
(74) *Attorney, Agent, or Firm* — Hamilton, Brook, Smith & Reynolds, P.C.

(57) ABSTRACT

Provisioning of resources to service consumers using flexible credentials scoped to enable the permissible uses of the resources. The credentials are not tied to a specific user, and can be shared among users, e.g., the credentials can be transferred, moved, pointed, or allocated to users collaborating on a particular project.

20 Claims, 5 Drawing Sheets

FLEXIBLE CREDENTIAL SUPPORTED SOFTWARE SERVICE PROVISIONING

CROSS-REFERENCE TO RELATED APPLICATIONS

This application is a national phase application pursuant to 35 U.S.C. § 371 of International Application No. PCT/US2019/062080 filed Nov. 18, 2019, which claims priority to U.S. Provisional Patent Application Ser. No. 62/768,843 filed Nov. 16, 2018, each of which is incorporated by reference herein.

BACKGROUND

When building software products, developers often need to find, purchase, and manage software services, e.g., to support a business operation. Conventional software services ecosystems do not enable developers to find, purchase, and manage their favorite services (infrastructure tools, communications tools, database resources, container tools, data logging tools, email tools) in a streamlined, private, and flexible manner, especially without being restricted to a single cloud or without losing credentials as individual users. Conventional services ecosystems do not provide an effective way for developers to discover and manage the many services they need to create modern software applications without being cabined to the offerings of monoclouds, and without being bogged down with time consuming credential management procedures for the various users on their development teams. The present disclosure addresses many weaknesses in conventional software services provisioning environments, including in some instances by using redirectable pointers configured to manage user-independent credentials in connection with the provisioning of purchased software services.

BRIEF DESCRIPTION OF THE DRAWINGS

The technology disclosed herein, in accordance with one or more various embodiments, is described in detail with reference to the included figures. The figures include drawings that are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 5:
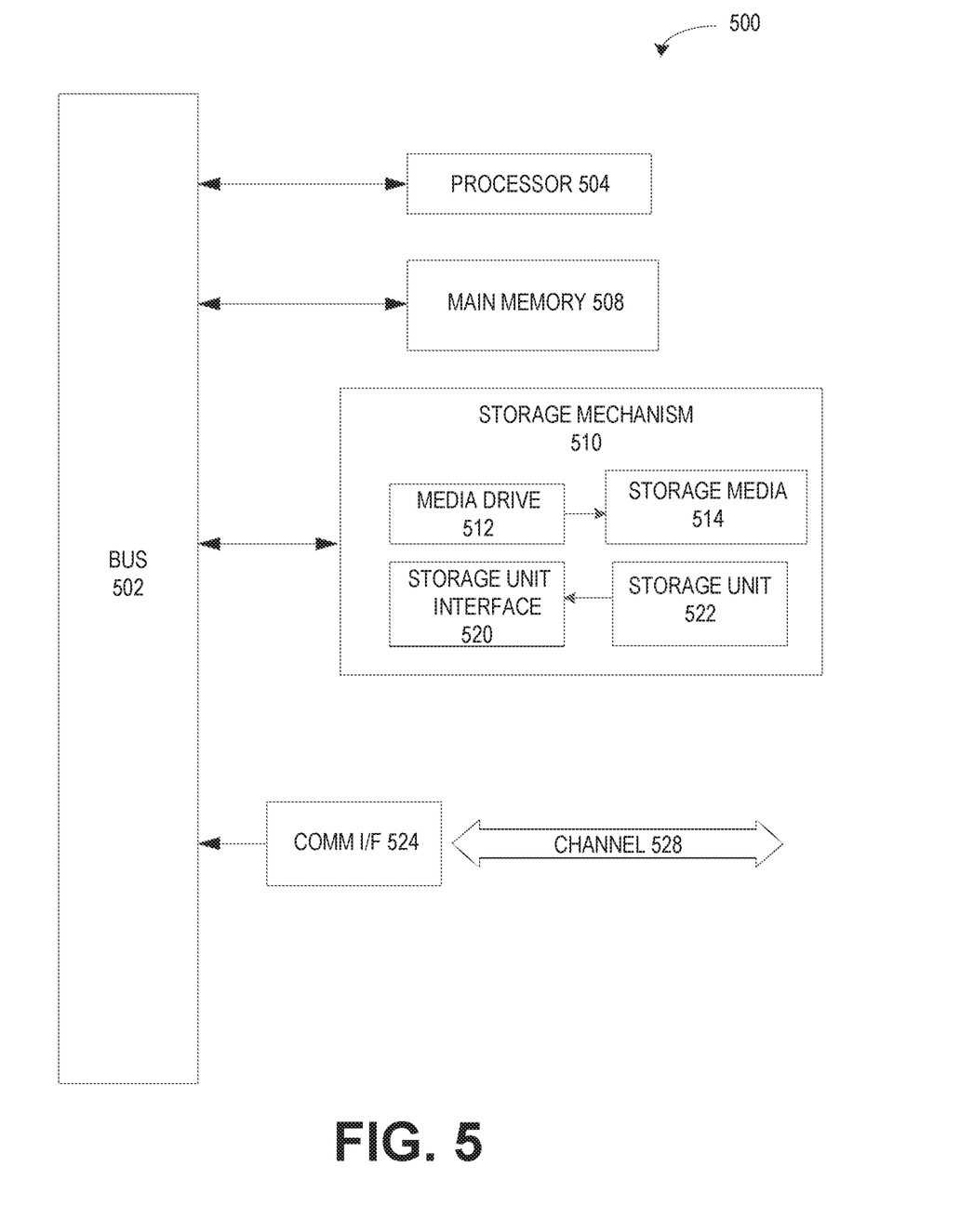
FIG. 5 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing component capable of carrying out the functionality described with respect thereto. One such example computing component is shown in FIG. 5. Various embodiments are described in terms of example-computing component 500 of FIG. 5. After reading this description, it will become apparent to a person skilled in the relevant art how to implement the technology using other computing components or architectures.

As used herein, the terms "computer program medium" and "computer usable medium" are used to generally refer to media such as, for example, memory 508, storage unit 522, media 514, and channel 528 of FIG. 5. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the disclosed technology as discussed herein.

As used herein, API(s) refers to Application Programming Interfaces which may include sets of subroutine definitions, communication protocols, or otherwise clearly defined methods of communication among various software components. In some embodiments, a service provider may offer one or more API(s) configured to receive and interpret requests from service consumers, and facilitate the provisioning of services from the service provider to a service consumer. The one or more API(s) provided by service providers of the present disclosure may facilitate the issuance and validation of credentials associated with use or access to provisioned services.

Figure 1:
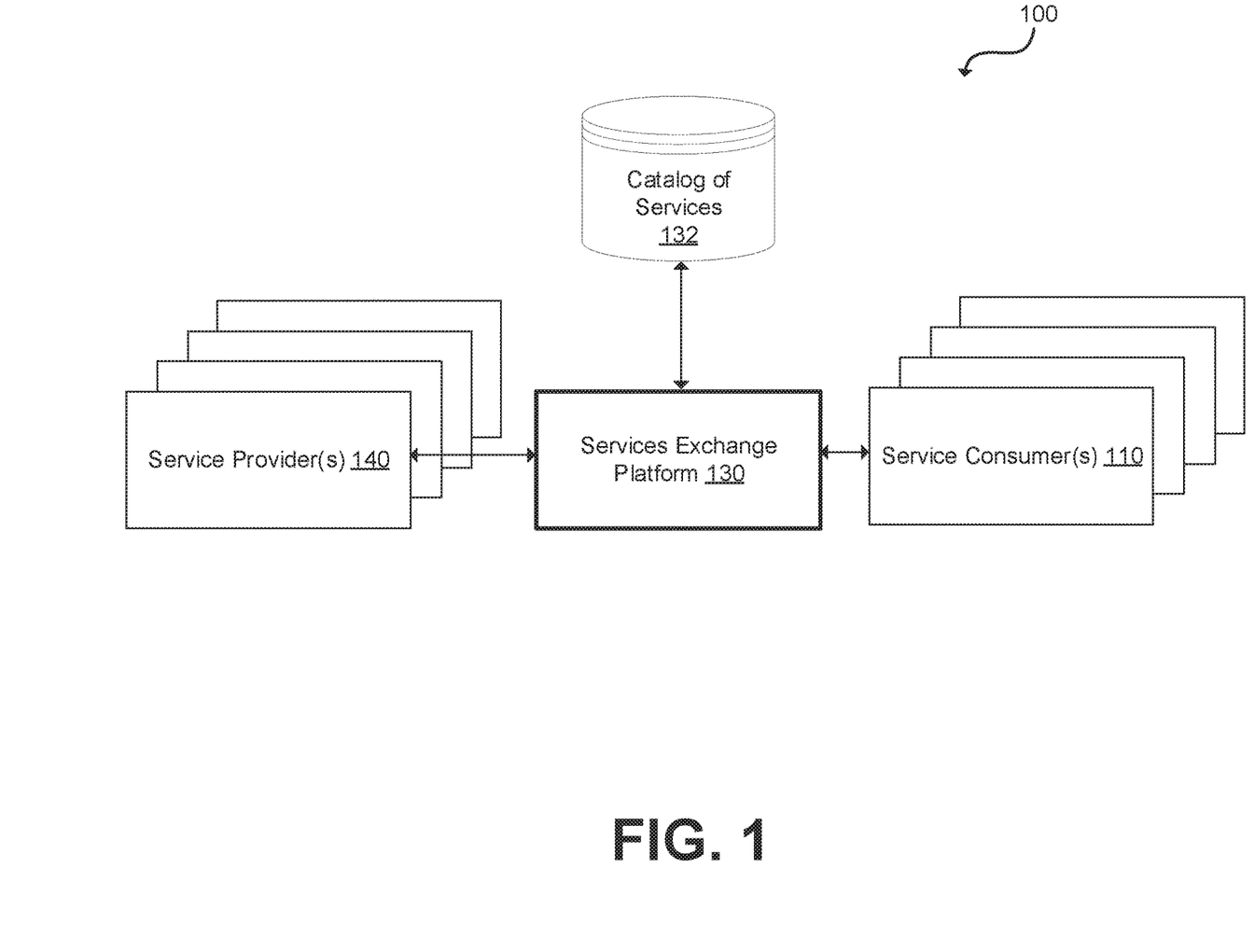
FIG. 1 illustrates an example flexible credential supported software service provisioning environment (sometimes referred to herein as an "intelligent provisioning environment" or "IPE") in accordance with one or more embodiments of the present disclosure.

FIG. 1 illustrates an example flexible credential-supported software service provisioning environment 100 (also referred to herein as "intelligent provisioning environment 100") within which embodiments of the present disclosure may be implemented. The intelligent provisioning environment 100 includes various entities configured to interact with each other to enable the provisioning of resources to service consumers using flexible credentials scoped to enable the permissible uses of such resources. As shown, in some embodiments the interacting entities that may operate in concert within the intelligent provisioning environment 100 may include service consumer(s) 110, service exchange platform 130 (which is optionally in operative communication with a database including a catalog of services 132), and service provider(s) 140.

Service provider(s) 140 include entities who have developed resource(s) that may be offered for use by service consumers 110 in their own product buildout. Although not explicitly shown in FIG. 1, in some instances, the software product built (or being built) by a service consumer 110 may be considered an entity in and of itself, operating within intelligent provisioning environment 100. As used herein, resources may include any software or any software related component including SaaS offered software, databases, or any other software related subsystems that may be used in a stack solution to support operations of a software product (e.g., an application). Non-limiting examples of service providers and the resources they offer include: JawsDB offering database resources, LogDNA offering logging services, Instabug offering bug reporting and crash reporting resources, etc.

Service consumer(s) 110, as indicated, are entities building, providing, or hosting software products that require inclusion of one or more software services (i.e., resources) in their stack for desired function and operation. By way of nonlimiting examples, a service consumer 110 may include a company, an organization, an institution, a venture, a group, a person, or any other entity or group of entities. With the technology of the present disclosure, service consumer(s) 110 may implement or utilize any one or more of resources from service provider(s) 140 in their stack solution for a particular product, and may seamlessly share access to those resources with others with whom they are collaborating for a particular project. For example, acquired resources may be organized into projects and shared with individual users on a development team associated with such projects. A team working together on a project, for instance, might include a dozen or more employees of a startup company (the service consumer 110) working together on a project to develop a new software product. With the technology of the present disclosure, access credentials to resources that may be relevant to the team may exist independent of any one member of the team, and may thus be transferred, moved, pointed, allocated, or otherwise shared among team members of a project.

Service exchange platform 130 may be an online platform that facilitates the interaction between the service providers 140 and the service consumers 110 in intelligent provisioning environment 100. As explained in further detail herein, service exchange platform 130 may provide an access portal (e.g., a web portal or dashboard where services can be shopped, teams can be created, and credentials for acquired software services can be managed, transferred, reassigned, etc.) to a catalog of services offered by service providers 140. Service exchange platform 130 is configured to facilitate the provisioning of services to service consumers 110 who have contracted for such services for use with their software products. Together with other elements of the disclosed environment, service exchange platform 130 proffers to service consumers 110 flexible credentials for access to resources they have purchased or otherwise acquired. A flexible credential is a credential that: (i) is not inseparably tied to any one individual user, and/or (ii) can be used by multiple users to access a resource in accordance with a service plan (i.e., the flexible credential is scoped to the permissions and/or authorizations purchased pursuant to a service plan), and/or (iii) is capable of surviving on its own even after the individual user who originally requested its creation is no longer participating in the intelligent provisioning environment (e.g., an employee quits working for a service consumer, but the flexible credential lives on), and/or (iv) is capable of being pointed to a product, a project, a team or subset of team member(s), and/or an account, and/or (v) may be encrypted. A flexible credential may be a key or token (both of which are referred to in the present disclosure by way of example).

Figure 2A:
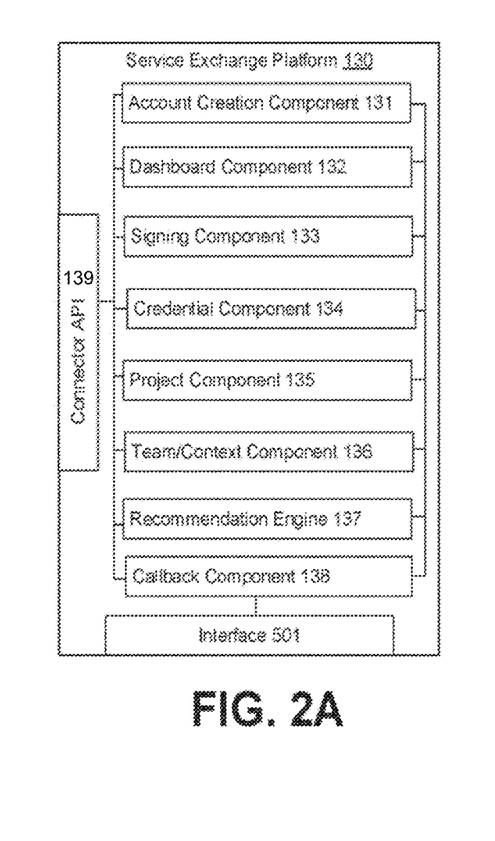
FIG. 2A illustrates example components of a service exchange platform entity that may be implemented in an intelligent provisioning environment in accordance with one or more embodiments of the present disclosure.

FIG. 2A illustrates example components of a service exchange platform 130 that may be implemented in an intelligent provisioning environment in accordance with one or more embodiments of the present disclosure.

As shown, service exchange platform 130 may include one or more APIs including a connector API(s) 139 configured to communicate with service provider(s) 140 (e.g., via a provider API 149 of the service provider(s) 140). Service exchange platform 130 may also include another communication interface 501 (for any other type of communications desired in a given deployment, including internet based communications from a service consumer 110 through a browser), as well as account creation component 131, dashboard component 132, signing component 133, credential component 134, project component 135, team/context component 136, recommendation engine 137, and callback component 138.

Account creation component 131 may be configured to receive requests to establish new accounts from individuals or entities that are prospective service consumers. Account creation component 131 may be configured to receive information from such individuals or entities, and based on that information create an account that allows the individual or entity to access the services marketplace offered through the service exchange platform 130. The account creation component 131 may prompt the requestor to provide various details, including payment details, location, product type, etc. to generate the account/profile for said requestor. The information exchange may occur through an online portal that a requestor may visit through a browser. For example, a service consumer 110 may use a web browser to navigate to a portal of a service exchange platform 130. Service consumer 110 may request that a new account be established on their behalf, so that they may engage in the intelligent provisioning environment 100. Upon receipt of the required information, account creation component 131 may create an account based on that information, and allow the requestor access to various features, including a dashboard wherein the new user may, inter alfa, shop for services, purchase services, create teams and/or projects, etc.

Dashboard component 132 may be configured to provide an interface through which service consumer(s) 110 may shop for resources (e.g., software services), engage in negotiations and enter agreements for services/resources from service providers 140, organize acquired resources, and create projects and teams with whom flexible credentials may be shared. Dashboard component 132 may be configured to provide recommendations (based on any of the information provided during account creation, prior usage of similar resources, location, product type, price, or based on any other metric determined to be plausibly relevant). Dashboard component 132 may operate as a portal to obtain the provisioning of any number of resources from service providers 140.

Signing component 133 is configured to sign requests sent to service providers so that the service providers can trust that the requests being made are legitimate, and that they originate from the service exchange platform 130. That is, in order to enable proper provisioning, deprovisioning, or resizing of resources and credentials, service exchange platform 130 may perform calls (e.g., HTTP calls) against a service provider 140's API (e.g., provider API 149). However, to trust that such calls are from a legitimate source (i.e., the service exchange platform 130), a service provider 140 may require that the requests be signed with a unique signature known between the parties. Thus, the requests sent by the service exchange platform 130 may be signed (via signing component 133), thereby allowing a service provider 140 to validate that received requests were actually made by the service exchange platform 130.

To sign a given request, signature component 133 may in some embodiments be configured to create a canonical form of the request and then create a signature to the request. Creating the request signature may involve creating an public key (e.g., Ed25519) signature of the canonical request form, and then using a live signing key pair. This key pair's public key may be signed by an offline public master key hosted by service exchange platform 130, and the public master key signature may thus be included with each signature. In some embodiments, the service exchange platform 130's offline public master key may be highly encrypted for enhanced security. For example, the service exchange platform 130's master key may be generated using a high quality entropy source on an air-gapped system. The master key may include one or more private portions, access to which is restricted to a limited set of individuals or entities. For example, private portions of the key may be distributed to each such individual or entity through a secret sharing algorithm (e.g., Shamir's Secret Sharing algorithm), and uniquely encrypted for each individual or entity. The simultaneous presence of these individuals, or a subset of these individuals, may be required to unencrypt the key. In some embodiments, the public master key is only used to sign live signing keys, which may in turn be used to sign the requests made to service provider(s) 140.

It should be appreciated that the signature for a request may comprise any type of signature implemented in any way known in the art or developed in the future. In some embodiments, the signature of the request may be relayed in a header. Such a header may contain the signature of the request, the public key of a keypair (e.g., ed25519 keypair) used to sign the request, and/or the signature of such a public key signed by the service exchange platform 130's master offline signing key. In such embodiments, a complete chain of trust may be established from the signature of the request all the way to the root signing key, thereby allowing a service provider 140 to verify the integrity and authenticity of the request from the service exchange platform 130. In some embodiments, the signature may include the request method, path, query parameters, various headers (including the Date and Host headers), and the request body.

Credential component 134 may be configured to receive access credentials from a service provider in response to a successful request for provisioning of services. Credential component 134 may be configured to provide a flexible credential (which may or may not be the same credential received from the service provider(s) 140) to service consumers 110 through the dashboard provided by dashboard component 132. As noted, a flexible credential may include any credential that: (i) is not inseparably tied to any one individual user, and/or (ii) can be used by multiple users to access a resource in accordance with a service plan (i.e., the flexible credential is scoped to the permissions and/or authorizations purchased pursuant to a service plan), and/or (iii) is capable of surviving on its own even after the individual user who originally requested its creation is no longer participating in the intelligent provisioning environment (e.g., an employee quits working for a service consumer, but the flexible credential lives on), and/or (iv) is capable of being pointed to a product, a project, a team or subset of team member(s), and/or an account, and/or (v) may be encrypted. A flexible credential may be a key or token (both of which are referred to in the present disclosure by way of example). Credential component 134 may also be configured to create/read API tokens for a team, responsive to a request from a user with appropriate role/permission designations.

Project component 135 may be configured to provide, in response to user selections as received through dashboard component 132, an encapsulation of modules and software components that a program/product may need to operate. In some embodiments, a project may be viewed as a solution stack. A project may be said to hold deployed resources that a service consumer 110 has launched or may launch through the service exchange platform 130 in connection with a product. In addition to third party resources being provisioned through the intelligent provisioning platform 100 for a given service consumer 110, a project may also include custom configuration options whereby a service consumer 110 may add its own software resources and/or any third-party software resources not otherwise available for purchase and provisioning through the service exchange platform 130. As resource(s) are provisioned for a project, and as credentials for such resources are obtained in connection with the project, project component 135 may be configured to allow the service consumer 110 to easily inject the credentials directly into the code of program products being developed within the project, or to export the credentials into a file such as an ".env" file. Functionality and features provided by project component 135 may be provided in part via dashboard component 132. That is, together with project component 135, dashboard component 132 may be configured to allow a service consumer 110 to export received credentials into a resource file or inject them automatically into a program on command. Thereby, users may share credentials with other members of team associated with the service consumer 110.

Projects can be shared with all team members by attaching the project to a created team (discussed below). This can be done upon the initial creation of the project, or by editing the project thereafter. Once shared, any team member may be able to view, access and control what happens with the shared project. With project component 135 configured to enable the foregoing, sharing a project with a team eliminates the requirement to engage in frequent insecure secret transfers, allowing developers more time to focus on building new products instead of wasting unnecessary amounts of time on credential management activities.

Team/context component 136 may be configured to create teams, i.e., to establish associations between one or more individuals with whom flexible access credentials may be shared for a given project. Functionality and features provided by project component 135 (as with all other features of service exchange platform 130) may be provided in part via dashboard component 132. That is, a user may access the dashboard via a web browser, and, after being authenticated, may share projects or individual resources with team members.

The creation of teams allows for easy credential sharing, so service consumers 110 no longer need to pass around their flash drives holding unencrypted keys in order for their peers to obtain access. To create a team, a user may select a "context" option. That is, a user can change the context within which it is experiencing the dashboard—whether as themselves individually, whether as a member of "Team A," for instance, or "Team B," and so on. Together with the team/context component 136, the dashboard component 132 may provide a dropdown list of all of the teams an account holder belongs to, the teams the account holder has created, or simply the account creator's personal account.

Team/context creation component 136 may be configured to allow a user (once a team has been created and named) to invite others to join the team (e.g., via a link within an email). Once an invitee accepts the invitation with either a new account or current account, they may be given full access to the relevant team's projects and resources account. Team/context creation component 136 may also allow an account holder to designate roles for different members of the team. Designation of roles may scope the permissible actions that a given team member may take in connection with the environment.

In some embodiments, example roles may include a read role, a read credentials role, a write role, and an admin role. A read role designation may provide a user with read access whereby the user can read all details of the team, projects and resources, except for resource credentials. A read credentials role may allow a user to do everything in the read role, plus the ability to read credentials. A write role may allow a user to do everything in the read credentials role, plus the ability to create, update and delete projects and resources. This may include creating custom resources. An admin role may allow a user to do everything in the write role, plus the ability to update the team's billing, add/remove users, and update user permissions on the team. In some embodiments, a user with an admin role may also have the ability to create/read API tokens for the team. In an embodiment, the information available to a user is based on a context of the user, e.g., the user can only view projects and resources for the team(s) of which the user is a member, or the user's personal information.

Recommendation engine 137 may be configured to generate recommendations to service consumer(s) 110 regarding resources they may be interested in using in their product, different plans for a resource that is already being provisioned for the service consumer 110, or any other type of recommendation or alert relevant to the service consumer 110's use of the intelligent provisioning environment 100. Generated recommendations may be provided as notifications or alerts to users, and/or may be viewable through a dashboard of service exchange platform 130. Such recommendations may be based on any of the information obtained during account creation, prior usage of similar or complementary resources, location, product type, price, or based on any other metric determined to be plausibly relevant to the service consumer 110's use of the intelligent provisioning environment 100.

Callback component 138 may be configured to allow provisioning of services over extended periods of time (e.g., greater than 60 seconds, greater than 3 minutes, greater than 5 minutes, etc., as defined). In some instances, such long running provisioning may continue even after the HTTP session begun by the request has ended. This may be enabled, for instance, by the callback component 138 embedding callback information (e.g., a callback URL and a unique identifier) within an initial request to the service provider 140, and the service provider 140 executing a callback operation in response thereto. A callback URL may refer to the URL to call to complete the operation and/or report the outcome to the service exchange platform 130. A unique identifier may include an encoded unique identifier (e.g., a unique 18 byte base32 encoded identifier) used for logging and/or debugging. Once the service provider 140 has completed the provision (or plan change, or deprovision operation, or other requested operation) it may, for example, send the outcome to a callback URL provided in the initial request to service exchange platform 130. In some embodiments, if service exchange platform 130 does not receive a callback within a certain period of time (e.g., 24 hours), the callback component of service exchange platform 130 may be configured to repeat the original request. In some embodiments, a callback request may be authenticated using an access token granted based on the service consumer 110's credentials.

In some embodiments, service exchange platform 130 provides a command-line interface ("CLI") alternative to a dashboard provided by dashboard component 132. Any and all of the features described herein with reference to service exchange platform 130 may be effectuated through such a CLI tool.

Figure 2B:
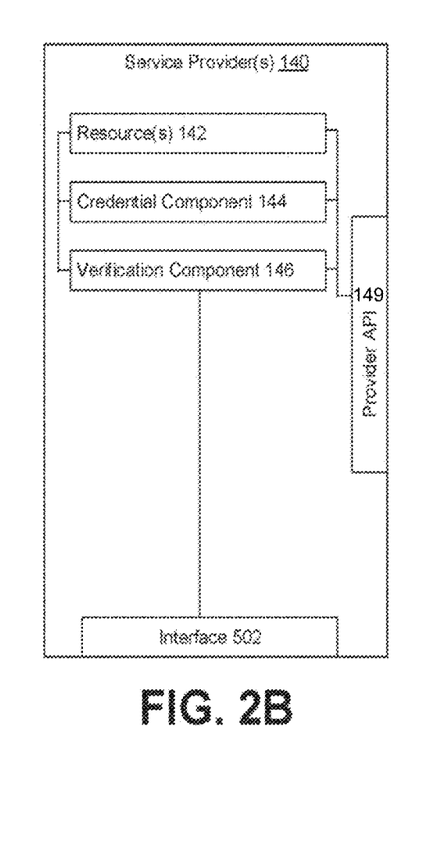
FIG. 2B illustrates example components of a service provider entity that may be implemented in an intelligent provisioning environment in accordance with one or more embodiments of the present disclosure.

FIG. 2B illustrates example components of a service provider entity 140 that may be implemented in an intelligent provisioning environment in accordance with one or more embodiments of the present disclosure.

As shown, service provider(s) 140 may include one or more provider API(s) 149 configured to communicate with service exchange platform 130 (e.g., via the service exchange platform 130's connector API 139). Service provider(s) 140 may also include another communication interface 502 (for any other type of communications desired in a given deployment), as well as resource(s) 142, a credential component 144, and a verification component 146.

As indicated above, resource(s) 142 may include any one or more software or software related services that the service provider(s) 140 may provision to subscribing service consumers 110, and/or manage on their behalf. In view of the discussion with reference to FIG. 2A, it should further be understood that resource(s) 142 can be added to a project once the project has been created. Resource(s) 142 may also be created by the service consumer 110 entity itself, and may also be provided within a project. When a service consumer 110 adds purchased resource(s) 142 to a project organized within the portal (e.g., the dashboard generated by dashboard component 132), the portal may allow the service consumer 110 (and other designated team members associated with the project) to view all of the credentials associated with resource(s) 142 that have been added to the project. Once a resource is provisioned, a service consumer 110 can access its flexible credentials. The flexible credentials allow users to connect/use the service and start integrating it into their product (e.g., program, application, etc.). That is, when logged into its account, the service consumer 110 may interact with the service exchange platform 130 dashboard to export designated flexible credentials into a resource file or inject them automatically into a program on command. Flexible credentials can be retrieved for either an entire project or a specific resource from either a web dashboard or a CLI. Flexible credentials for a resource can be a anything from a single URL for a postgres database or multiple keys for a different service.

Credential component 144 may be configured to issue flexible credentials upon receiving a satisfactory request from service exchange platform 130 on behalf of a service consumer 110. The flexible credentials may be received by credential component 134 of service exchange platform 130 and deployed within projects and programs as disclosed herein.

Verification component 146 may be configured to verify that received requests are legitimate and/or authentic. Verification component 146 of a service provider(s) 140 may verify requests in any manner. For example, service provider 140 may verify a request by creating the canonical form of the request in the same or similar manner as performed by the signing component 133 of service exchange platform 130, and verify that the signature is as expected. In some embodiments, to verify a request signature, verification component 146 of service provider 140 may be configured to first verify that the signature of the public key included in the header of the request is valid and signed by service exchange platform 130's offline signing key. Then service provider 140 may verify that the signature of the request is a valid signature on the canonical form of the request, and that it was signed by the public key included in a request header. Once verified, service exchange platform 130 may serve the request and provision the service (or, as the case may be, deprovision the service, change the plan for the service, or perform other actions as requested).

In some instances a service provider 140 may complete a service exchange platform 130's request promptly, for example, a quick provision of a logging resource that can occur within 60 seconds or less (sometimes referred to herein as synchronous completion). In other instances a service provider 140 may not be able to complete the request so promptly, for example, where the request demands the provisioning of a large database instance that can take up to 24 hours or more (sometimes referred to herein as asynchronous completion). In some instances, the service provider may not be able to complete the request before the HTTP session begun by the request has ended. However, service exchange platform 130 of the present disclosure may be configured to allow a service provider 140 to proffer an API implementation that permits long running provisioning. Such features may be provided by the callback component 138.

Figure 3:
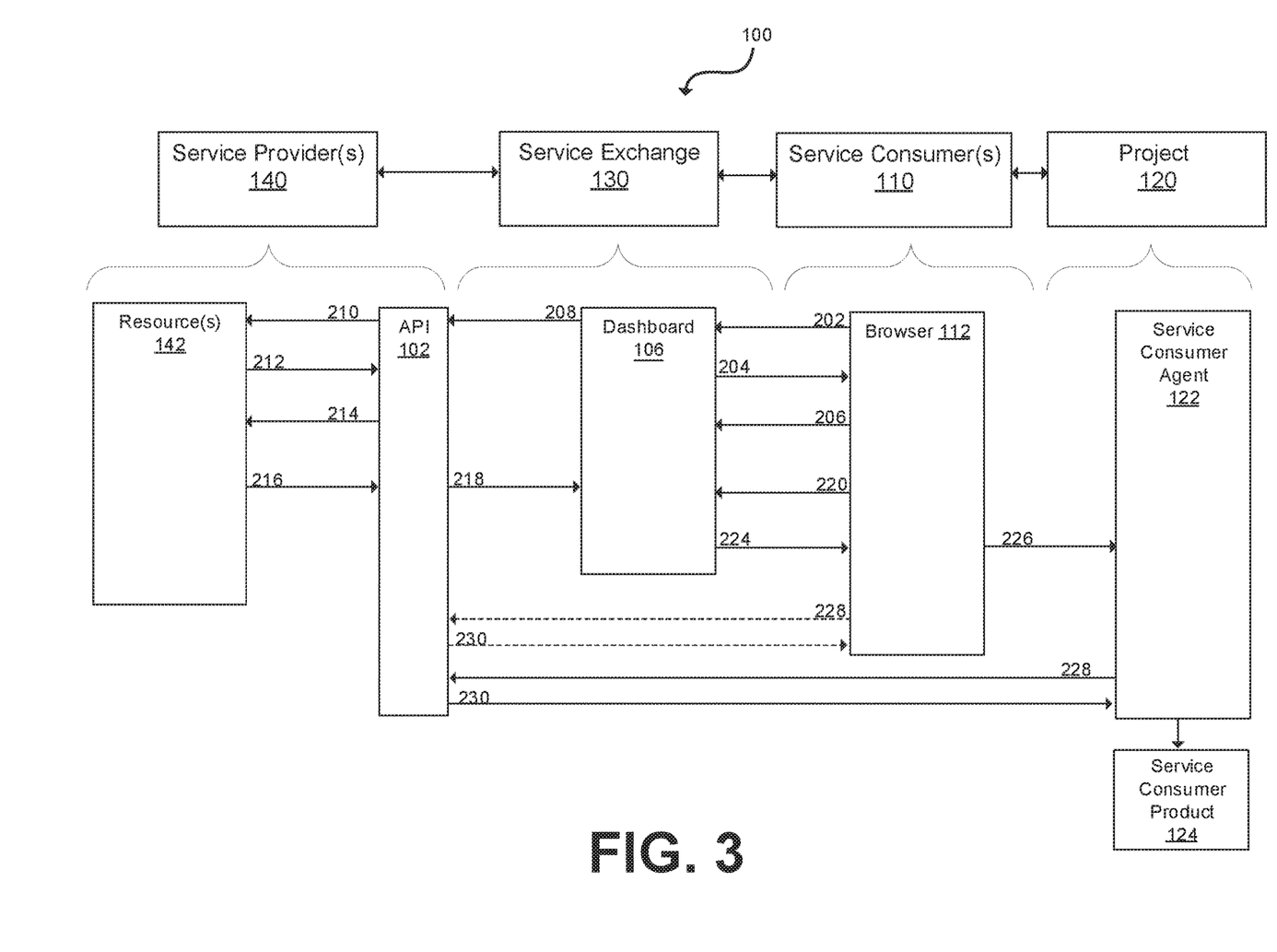
FIG. 3 illustrates a high-level communications flow diagram in an example intelligent provisioning environment in accordance with one or more embodiments of the present disclosure.

FIG. 3 illustrates an example communication flow diagram in an example intelligent provisioning environment 100 in accordance with one or more embodiments of the present disclosure. The intelligent provisioning environment 100 may include a plurality of entities in communication with one another, including a service provider 140, a service exchange platform 130, a service consumer 110, and a project 120 that may use one or more services provided by a resource 142. The process flow and interaction among entities may be effectuated by any one or more of the components or other elements discussed above.

As shown, a service consumer 110 may use a browser 112 to navigate to a service exchange platform 130 portal (e.g., dashboard 106) where various resources may be searched, purchased, and managed through an account. Service consumer 110 may send a request 202 to the service exchange platform 130, together with inputted details required by service exchange platform 130, to create an account. As shown, communication 202 (together with inputted details required by service exchange platform 130) may be effectuated via dashboard 106 accessible through browser 112, for example. Upon receiving communication 202 (and any other back and forth communications required) including appropriate details from service consumer 110, service exchange platform 130 may create an account for service consumer 110 and communicate the same to service consumer 110 via communication 204.

Upon account creation, service consumer 110 may log-in and log-out of the service exchange portal (e.g., the dashboard 106) as desired, and therein navigate resource 142 offerings (including SaaS tools, software widgets, and other offerings, etc.) that may be obtained from various service providers 140. Users associated with the service consumer 110 can sign-in to dashboard 106 (under the same, related, or entirely new accounts) for browsing and requesting provisioned resources offered by the service provider(s) 140. In some embodiments, the resulting user session on the service provider 140's side may be restricted to the already provisioned resource(s) 142, but may also allow the user to access service provider 140-specific features associated with such resource 142.

Upon identifying a resource 142 desired for use in a project 120 (e.g., development of a software product), service consumer 110 may select the identified resource 142 by effecting a communication 206 to service exchange platform 130 via dashboard 106 indicating the selection. Communication 206 may include a selection of a service plan being offered by service provider 140 for the particular resource. For example, a particular resource being offered on the exchange may be obtained for use in a product for a fee of $5 per month. Communication 206 may also include billing information for payment for the resources selected.

As noted above, service exchange platform 130 may communicate with service provider 140 through an API 102 (e.g., a service provider API such as API 149), including by effecting communication 208 (which may be signed) to API 102 designating the service consumer 110's selection. In response, API 102 may provide a service provision request to service provider 140, via communication 210, for provisioning one or more resource(s) 142 for a project 120. Responsively, service provider 140 may validate the request and return an indication to API 102, in communication 212, of confirmation or agreement to provision the selected resource(s) 142 to the service consumer 110 under the agreed upon conditions. In some embodiments, the selected resource(s) 142 includes a suite of services that may be provided in a listing for further selection and implementation within a product or throughout a project. The granularity of selection may vary from one context to the next, depending on the interests of the service provider 140 in meeting particular needs of various service consumers 110, for example.

In some embodiments, selection and agreement of service provisioning terms through the API 102 may be achieved through simple selection and provisioning operations. In other embodiments, selection and agreement of service provisioning terms through the API 102 may involve a back-and-forth negotiation for any given aspect of the contractual arrangement (e.g., payment terms, features provided, management parameters, etc.) until a service provisioning arrangement is reached. The API 102 may then make a request 214 for new credentials specific to service consumer 110's access and use of resource(s) 142 (or a particular set of SaaS offerings of resource(s) 142). Service provider 140 may provide credentials through API 102, in communication 216, and make the credentials available via the dashboard 106. API 102 may further be configured to provide a listing of the suite of services that are associated with the resource(s) 142 and which may be provided for further selection and implementation within a product or throughout a project.

In some embodiments, an authorization protocol may be deployed to grant a service provider 140 an access token scoped to a user and the selected resource(s) 142. For instance, the service exchange platform 130 may use OAuth 2.0 (or other authorization protocol) to grant a service provider 140 such a token. In some embodiments, service exchange platform 130 may be responsible for creating a scoped authorization code consistent with the authorization protocol, and may forward the user to the service provider 140's implementation of a single-sign-on. The code to grant an access token and a selected resource ID may be included as query parameters to the request. In some embodiments, an access token can be created by the service provider 140 by issuing a POST request via the authentication protocol (e.g., OAuth 2.0) which may be included as part a connector API of the service exchange platform 130 (e.g., connector API 139). Once an access token has been granted, the service provider 140 can issue requests on behalf of the user to the service exchange platform 130 (e.g., via a connector API) to retrieve information about the user and the resource(s) 142 in question. The service provider 140 may validate that the user has access to the targeted resource(s) 142 by requesting information about the service consumer 110 from the service exchange platform 130 (e.g., via connector API 139) using the granted access token. To do this, the service provider 140 may create their own login session with the user for further authentication for accessing the dashboard 106.

In some embodiments, the granted access token may be stored securely and only used by the service provider 140's server to request data from service exchange platform 130 to render or implement any dashboard functionality. In some embodiments, the granted access tokens may only be valid for a predetermined time period, e.g., 24 hours. After the token has expired, the user must sign-on again through the dashboard 106 to be granted a new token.

In some embodiments, service consumer 110 may issue a machine token request 220 to service exchange platform 130 via dashboard 106. Service exchange platform 130 may responsively issue a machine token to service consumer 110 in communication 224. Thereafter, in communication 226, the machine token may be configured for a service consumer agent 122 (i.e., a software agent configured to inject credentials for a resource 142 into a particular service consumer product 124). Upon receiving communication 226, consumer service agent 122 requests credentials from API 102 in communication 228, and receives such credentials back therefrom in communication 230. In alternative embodiments, the credential request may originate via browser 112 instead of service consumer agent 122. This is shown in the dotted lines of FIG. 3 indicating communication 228 and 230 between browser 112 and API 102. Once appropriate credentials are obtained, service consumer agent 122 may inject credentials for the resource 142 into a particular service consumer product 124. In some embodiments, API 102 may separate resource and credential creation so that credentials may be independently addressable, i.e., the credentials can be added, removed, and updated independent of the resource lifecycle.

In some embodiments, machine tokens issued by service exchange platform 130 are stored separately from any one service consumer 110. Such machine tokens may be dual encrypted with bookend encryption, i.e., instead of storing the machine token in plain text, a hash algorithm is first applied to create a hashed machine token. The machine token may be, for example, AF9B2C1D. Thereafter, to effect the aforementioned dual encryption, a portion of the machine token is further encrypted such that the entire token is not viewable within the dashboard 106. For example, the machine token may only be displayed as AF9 . . . 1D, the dual encrypted portion being the "B2C," providing additional security to the machine token as displayed within the dashboard 106 of the services exchange platform 130.

Figure 4:
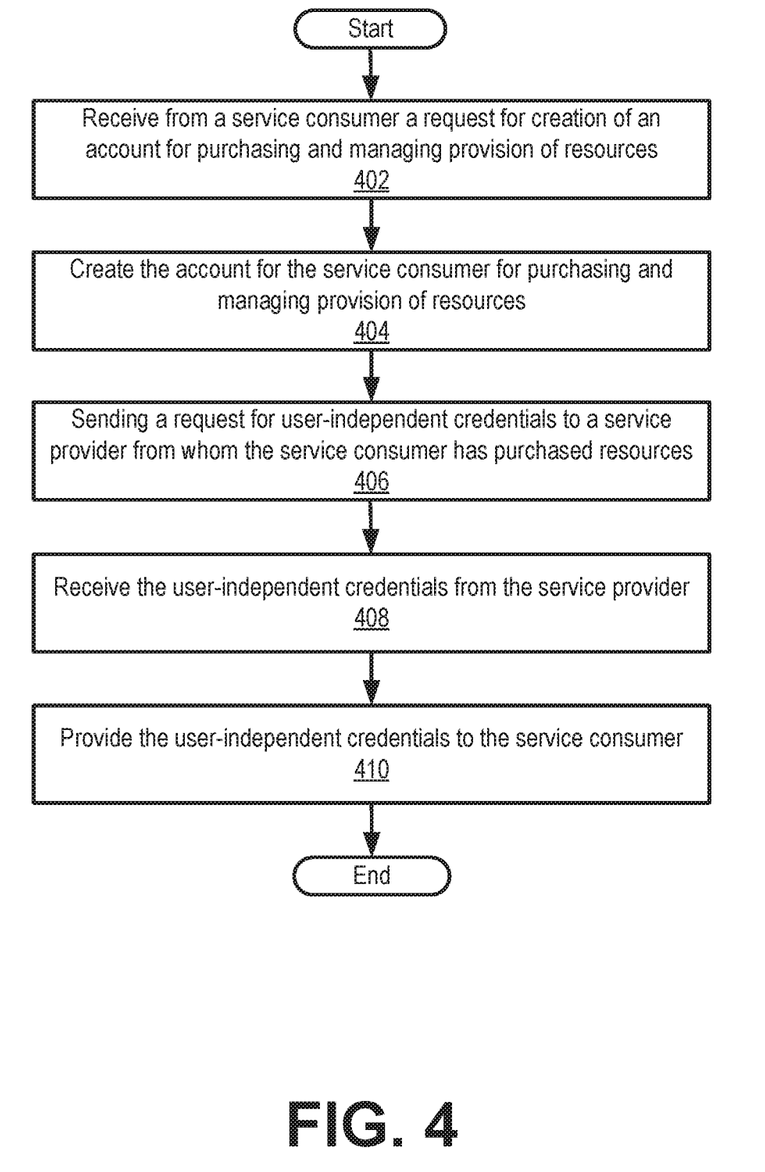
FIG. 4 depicts a flowchart of an example of a method for providing flexible credentials to a service consumer in accordance with one or more embodiments of the present disclosure.

FIG. 4 depicts a flowchart of an example of a method for providing flexible credentials to a service consumer in accordance with one or more embodiments of the present disclosure.

The flowchart 400 begins at module 402, where the service exchange platform receives an account creation request from a service consumer. As noted herein, the account allows the service consumer to shop for and purchase resources from a plurality of service providers. The flowchart 400 continues to module 404, where the service exchange platform creates the account for the service consumer. In some embodiments, the account is created after the service consumer has provided various details (payment details, location, product type, etc.) to the service exchange platform. In some embodiments, a user profile is created for the service consumer based on the information provided by the service consumer.

The flowchart 400 continues to module 406, where the service exchange platform send a request for flexible credentials to a service provider from whom the service consumer has purchased one or more resources. The flexible credentials allow the service consumer to access and manage the purchased resources. As noted herein, a flexible credential is a credential that (i) is not inseparably tied to any one individual user, and/or (ii) can be used by multiple users to access a resource in accordance with a service plan, and/or (iii) is capable of surviving on its own even after the individual user who originally requested its creation is no longer participating in the intelligent provisioning environment, and/or (iv) is capable of being pointed to a product, a project, a team or subset of team member(s), and/or an account, and/or (v) may be encrypted.

The flowchart 400 continues to module 408 where the service exchange platform receives the flexible credentials from the service provider, and ends at module 410 where the service exchange platform provides the flexible credentials to the service consumer. The service consumer is then able to access the resources and manage the provision thereof, e.g., by creating teams and/or projects. In some embodiments, the service consumer manages the provisioning of the resources using a dashboard provided by the service exchange platform.

FIG. 5 illustrates an example computing component 500 that may be used in implementing various features of embodiments of the disclosed technology. Computing component 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" or "component" does not imply that the components or functionality described or claimed as part of the module or component are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method comprising:
by a service exchange platform implemented by a processor and a memory with computer code instructions stored thereon:
receiving, from a service consumer, a request for an account for, via the service exchange platform, purchasing software resources offered by a plurality of service providers and managing provisioning of the software resources;
creating an account for the service consumer, the account enabling the service consumer to access the software resources offered by the plurality of service providers;
sending, to a particular service provider of the plurality of service providers, a request for credentials for accessing one or more software resources, wherein the one or more software resources are (i) purchased by the service consumer from the particular service provider and (ii) accessed by the service consumer, via the service exchange platform, for use in a software project;
receiving, from the particular service provider, the credentials for accessing the one or more software resources;
providing, to the service consumer, the credentials for accessing the one or more software resources; and
wherein the credentials for accessing the one or more software resources are user-independent and capable of being shared among multiple users associated with the service consumer to enable the use in the software project of the one or more software resources.

2. The method of claim 1, further comprising providing, by the service exchange platform to the service consumer, a portal to facilitate managing provisioning of the one or more software resources.

3. The method of claim 1, further comprising signing, by the service exchange platform, the request for the credentials to enable validation of the request by the particular service provider.

4. The method of claim 1, wherein the credentials are encrypted.

5. The method of claim 1, wherein the credentials comprise a key or a token.

6. The method of claim 5, wherein the key or token is dual encrypted using bookend encryption.

7. The method of claim 1, wherein the software project is a product of the service consumer and, where the credentials are configured to be injected into the product of the service consumer.

8. The method of claim 1, wherein the credentials are configured to be added, removed or updated independent of a lifecycle of the one or more software resources.

9. The method of claim 1, wherein the credentials are configured to be one or more of transferred, moved, pointed, and allocated to members of a particular team of the service consumer.

10. The method of claim 1, wherein the one or more software resources comprise one or more of software, software-as-a-service (SaaS), databases, logging services, and error reporting services.

11. A system comprising:
a processor; and
a memory with computer code instructions stored thereon, the processor and the memory, with the computer code instructions, being configured to cause the system to implement a service exchange platform configured to:
receive from a service consumer a request for an account for, via the service exchange platform, purchasing software resources offered by a plurality of service providers and managing provisioning of the software resources;
create an account for the service consumer, the account enabling the service consumer to access the software resources offered by the plurality of service providers;
send to a particular service provider of the plurality of service providers a request for credentials for accessing one or more software resources, where the one or more software resources are (i) purchased by the service consumer from the particular service provider and (ii) accessed by the service consumer, via the service exchange platform, for use in a software project;
receive from the particular service provider the credentials for accessing the one or more software resources;
provide to the service consumer the credentials for accessing the one or more software resources; and
wherein the credentials for accessing the one or more software resources are user-independent and capable of being shared among multiple users associated with the service consumer to enable the use in the software project of the one or more software resources.

12. The system of claim 11, wherein the service exchange platform is configured to provide to the service consumer a portal to facilitate managing provisioning of the one or more software resources.

13. The system of claim 11, wherein the service exchange platform is configured to sign the request for the credentials to enable validation of the request by the particular service provider.

14. The system of claim 11, wherein the credentials are encrypted.

15. The system of claim 11, wherein the credentials comprise a key or a token.

16. The system of claim 15, wherein the key or token is dual encrypted using bookend encryption.

17. The system of claim 11, wherein the software project is a product of the service consumer and, where the credentials are configured to be injected into the product of the service consumer.

18. The system of claim 11, wherein the credentials are configured to be added, removed or updated independent of a lifecycle of the one or more software resources.

19. The system of claim 11, wherein the credentials are configured to be one or more of transferred, moved, pointed, and allocated to members of a particular team of the service consumer.

20. The system of claim 11, wherein the one or more software resources comprise one or more of software, software-as-a-service (SaaS), databases, logging services, and error reporting services.

* * * * *